(12) United States Patent
Terada et al.

(10) Patent No.: US 6,483,272 B1
(45) Date of Patent: Nov. 19, 2002

(54) POWER SYSTEM FOR ELECTRIC VEHICLE

(75) Inventors: Junji Terada, Iwata (JP); Toshiaki Yamada, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/581,703
(22) PCT Filed: Oct. 15, 1999
(86) PCT No.: PCT/JP99/05708
§ 371 (c)(1),
(2), (4) Date: Aug. 25, 2000
(87) PCT Pub. No.: WO00/22714
PCT Pub. Date: Apr. 20, 2000

(30) Foreign Application Priority Data

Oct. 15, 1998 (JP) ............................................ 10-294092

(51) Int. Cl.[7] .................................................. H02J 7/00
(52) U.S. Cl. ........................................................ 320/103
(58) Field of Search ................................ 320/107, 108, 320/109, 116, 103

(56) References Cited

U.S. PATENT DOCUMENTS

| 5,712,795 A | * | 1/1998 | Layman et al. ............. 700/297 |
| 5,789,898 A | * | 8/1998 | Suzuki et al. ............... 320/104 |
| 5,798,702 A | * | 8/1998 | Okamoto et al. ........... 320/106 |
| 5,864,224 A | * | 1/1999 | Takechi et al. ............. 320/152 |
| 5,886,527 A | * | 3/1999 | Ito .............................. 320/150 |
| 5,896,024 A | * | 4/1999 | Bradus et al. .............. 320/125 |
| 5,942,878 A | * | 8/1999 | Ito .............................. 320/131 |
| 5,963,140 A | * | 10/1999 | Kawaguchi et al. ........ 320/127 |
| 5,982,148 A | * | 11/1999 | Mercer ....................... 320/134 |

* cited by examiner

Primary Examiner—Edward H. Tso
Assistant Examiner—Pia Tibbits
(74) Attorney, Agent, or Firm—Ernest A. Beutler

(57) ABSTRACT

In a motorized vehicle power system 403 provided with a rechargeable battery 400, a battery control unit 401 for executing control of battery conditions including the remaining capacity of the rechargeable battery 400 and a charging unit 402 for charging the rechargeable battery 400, the charging unit 402 is provided with a discharging device 404 for executing refreshing discharge of the rechargeable battery 400 and a discharge control device 405 for controlling the refreshing discharge by the charging device 404 on the basis of a refreshing discharge requirement signal sent from the battery control unit 401.

17 Claims, 15 Drawing Sheets

FIG. 4

CHARGE AND DISCHARGE CONTROL DATA (BATTERY CONTROL UNIT → CHARGING UNIT)

| No | CONTENTS |
|---|---|
| 1 | REFRESHING NOTIFICATION (PRESENT OR ABSENT) |
| 2 | REFRESHING DISCHARGE CURRENT VALUE |
| 3 | REFRESHING DISCHARGE STOP VOLTAGE |
| 4 | REFRESHING TIMER VALUE |
| 5 | CHARGING START LOWER LIMIT TEMPERATURE |
| 6 | CHARGING START UPPER LIMIT TEMPERATURE |

FIG. 5

BATTERY STATE DATA (BATTERY CONTROL UNIT → CHARGING UNIT)

| No | CONTENTS |
|---|---|
| 1 | BATTERY TEMPERATURE 1 (SINGLE) |
| 2 | BATTERY TEMPERATURES 2 .. n (PARALLEL) |
| 3 | BATTERY VOLTAGE |
| 4 | REMAINING BATTERY CAPACITY (VALUE AT THIS STAGE) |
| 5 | EFFECTIVE BATTERY CAPACITY (MAXIMUM CAPACITY LEARNED VALUE AT THIS STAGE) |

FIG. 6

CHARGER STATE DATA (CHARGING UNIT → BATTERY CONTROL UNIT)

| No | CONTENTS |
|---|---|
| 1 | CHARGE AND DISCHARGE CONTROL DATA REQUEST |
| 2 | BATTERY STATE DATA REQUEST |
| 3 | REFRESHING IN OPERATION |
| 4 | END OF REFRESHING |
| 5 | CHARGING IN OPERATION |
| 6 | WAITING FOR CHARGING |
| 7 | COMPLETION OF CHARGING |
| 8 | STOP OF CHARGING |

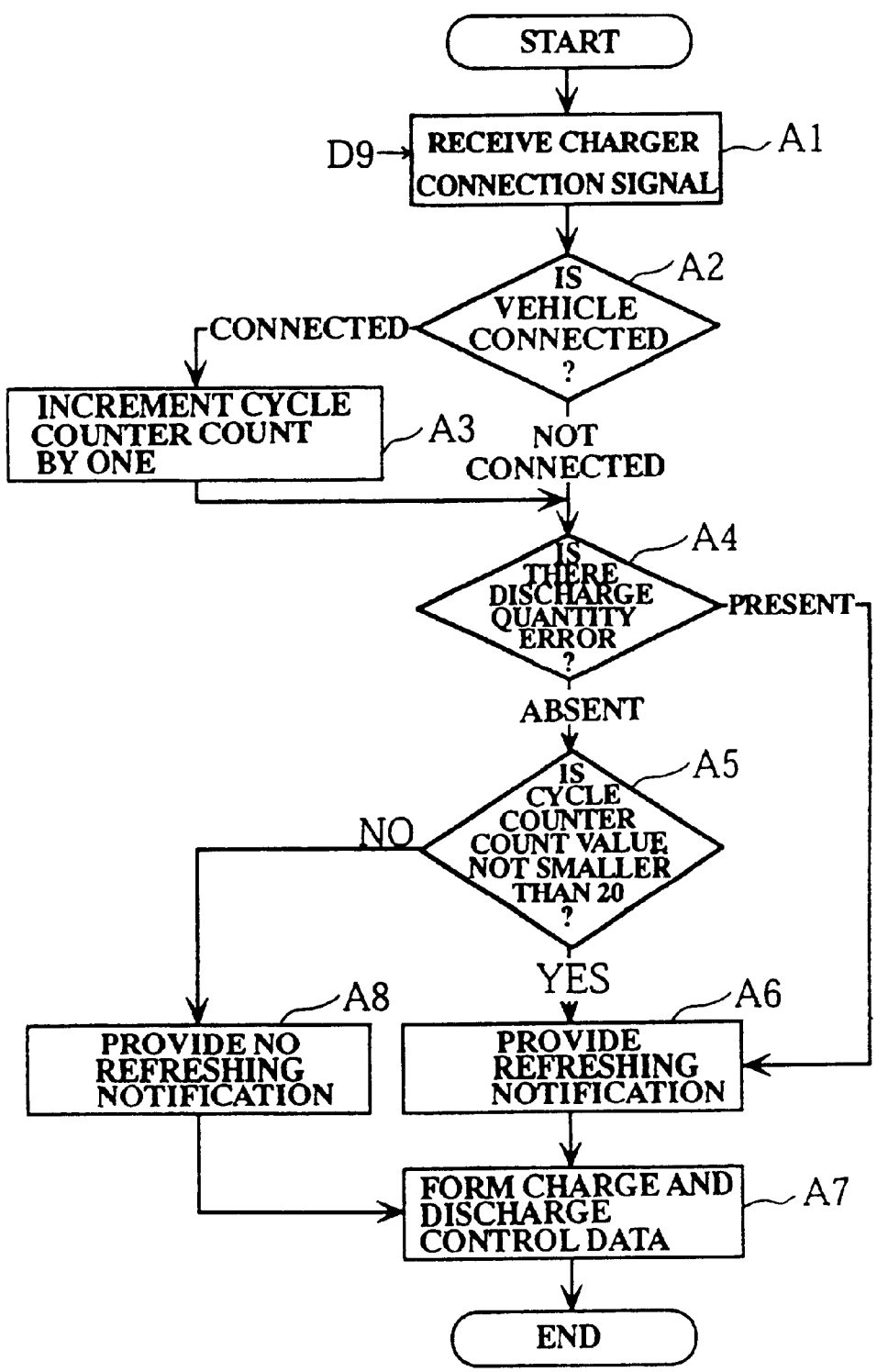

FIG. 9 — REFRESHING NOTIFYING PROCESS (BATTERY CONTROL UNIT)

FIG. 11  DISCHARGING PROCESS FOR REFRESHING (CHARGING UNIT)

POWER SYSTEM FOR ELECTRIC VEHICLE

BACKGROUND OF THE INVENTION

The present invention relates to a motorized vehicle power system provided with a battery control unit for executing control of the state of a rechargeable battery of Ni—Cd, Ni—MH or the like to be used as an energy source for, for example, a motorized bicycle, a motorized wheelchair, a motorized S/C and a charging unit for electrically charging the rechargeable battery.

It is generally well known that the so-called "memory effect" occurs in a rechargeable battery such as Ni—Cd and Ni—MH batteries that employ Ni for their positive electrodes. The memory effect results if charging is repeated without discharging the electric charges to a sufficient depth of discharge. This results in the voltage characteristic in the discharging stage being degraded with a reduction in discharge capacity to a discharge stop voltage. It is known that the battery can be effectively refreshed by being once discharged to the depth of discharge (refreshing discharge) by a discharger in order to cancel the memory effect. Recently, in view of economical wastefulness caused by the separate installation of a charger and a discharger, it has been proposed to provide a built-in discharger inside the charger and let the user select between a charging operation and a refreshing discharge operation manually by means by means of a switch or the like of the charger.

The refreshing discharge is a very effective means for canceling the memory effect. However, due to the existence of innate variation in capacity between the cells of an assembled battery constructed of a plurality of connected single cells, it is possible that one or more cells become overdischarged in the refreshing discharge stage. If the refreshing discharge is freely executed by the user's decision, then a refreshing discharge may be executed although not required. This consequently leads to the problem that the frequency of refreshing discharge is increased and causes deterioration of the assembled battery.

SUMMARY OF THE INVENTION

The present invention has been made in view of the aforementioned problems and has the object of providing a motorized vehicle power system capable of optimizing the refreshing discharge timing of the rechargeable battery.

FIG. 14 is a schematic diagram showing the basic relationship of the components according to the first inventive aspect. As shown there a motorized vehicle power system 403 is provided with a rechargeable battery 400, a battery control unit 401 for executing control of battery conditions including the remaining capacity of the battery 400 and a charging unit 402 for charging the rechargeable battery 400. The charging unit 402 is provided with a discharging means 404 for executing refreshing discharge of the rechargeable battery 400. A discharge control means 405 controls the refreshing discharge executed by the charging means 404 on the basis of a refreshing discharge requirement signal sent from the battery control unit 401.

According to a second inventive aspect, based on the first inventive aspect, the discharge control means 405 of the charging unit 402 controls the discharging means 404 so as to enable refreshing discharge by the discharging means 404 only when a refreshing discharge requirement signal is received from the battery control unit 401.

According to a third inventive aspect, based on the second inventive aspect, the discharge control means 405 displays on a display means 407 the information of the reception of the refreshing discharge requirement signal from the battery control unit 401 upon receiving the signal.

According to a fourth inventive aspect, based on the third inventive aspect, the discharge control means 405 operates to execute refreshing discharge by the discharging means 404 when a refreshing switch 409 is turned on within a specified time and thereafter executes charging and operates to execute charging when the switch is not turned on while the information of the reception of the refreshing discharge requirement signal from the battery control unit 401 is displayed on the display means 407.

According to a fifth inventive aspect, based on the second inventive aspect, the discharge control means 405 operates to start the refreshing discharge by the discharging means 404 and display the refreshing in operation on the display means 407 upon receiving the refreshing discharge requirement signal and operate to stop the refreshing discharge and execute charging when a refresh cancel switch is turned on.

According to a sixth inventive aspect, based on any one of the first through fifth inventive aspects, the battery control unit 401 decides whether or not the refreshing discharge is necessary on the basis of at least any one of (a) the number of times of charging, (b) the number of times of discharging or (c) the number of cycles of charging and discharging, counted from the initial or preceding refreshing discharge.

According to a seventh inventive aspect, based on any one of the first through fifth inventive aspects, the battery control unit 401 decides that the refreshing discharge is necessary when a difference larger than a specified quantity exists between a battery effective capacity perceived by the battery control unit 401 and a discharge capacity down to a specified setting voltage.

According to an eighth inventive aspect, based on any one of the first through fifth inventive aspects, the battery control unit 401 decides that the refreshing discharge is necessary when the refreshing discharge is not executed down to the completion of refreshing after the display of the necessity of the preceding refreshing discharge.

According to a ninth inventive aspect, based on any one of the first through fifth inventive aspects, the battery control unit executes weighting of the number of times of charging on the basis of either a battery temperature at the time of starting charging or a battery temperature at the time of ending charging and decides that the refreshing discharge is necessary when the weighted number of times of charging becomes equal to or greater than a predetermined value.

According to a tenth inventive aspect, based on the ninth inventive aspect, the battery control unit increases the weighting as the battery temperature becomes higher.

According to an eleventh inventive aspect, based on the ninth or tenth inventive aspect, the battery control unit counts the number of times of charging when discharging is executed by a specified quantity or more after the end of the charging.

According to a twelfth inventive aspect, based on any one of the first through eleventh inventive aspects, a removable battery casing to be mounted on a vehicle and a charging unit 402 that is mounted on or not on the vehicle are provided. The removable battery casing has the battery control unit 401 built-in.

According to a thirteenth inventive aspect, based on any one of the first through eleventh inventive aspects, the rechargeable battery 400, the battery control unit 401 and the charging unit 402 are mounted in a fixed manner on the vehicle.

BRIEF DESCRIPTION OF THE DRAWINGS

FIG. 4 is a diagram for explaining signal data to be communicated between a battery control unit and a charging unit of the above power system;

FIG. 5 is a diagram for explaining signal data to be communicated between the battery control unit and the charging unit of the above power system;

FIG. 6 is a diagram for explaining signal data to be communicated between the battery control unit and the charging unit of the above power system;

FIG. 7 is a flowchart for explaining the operation of the above battery control unit;

DETAILED DESCRIPTION OF THE PREFERRED EMBODIMENTS

Figure 1:
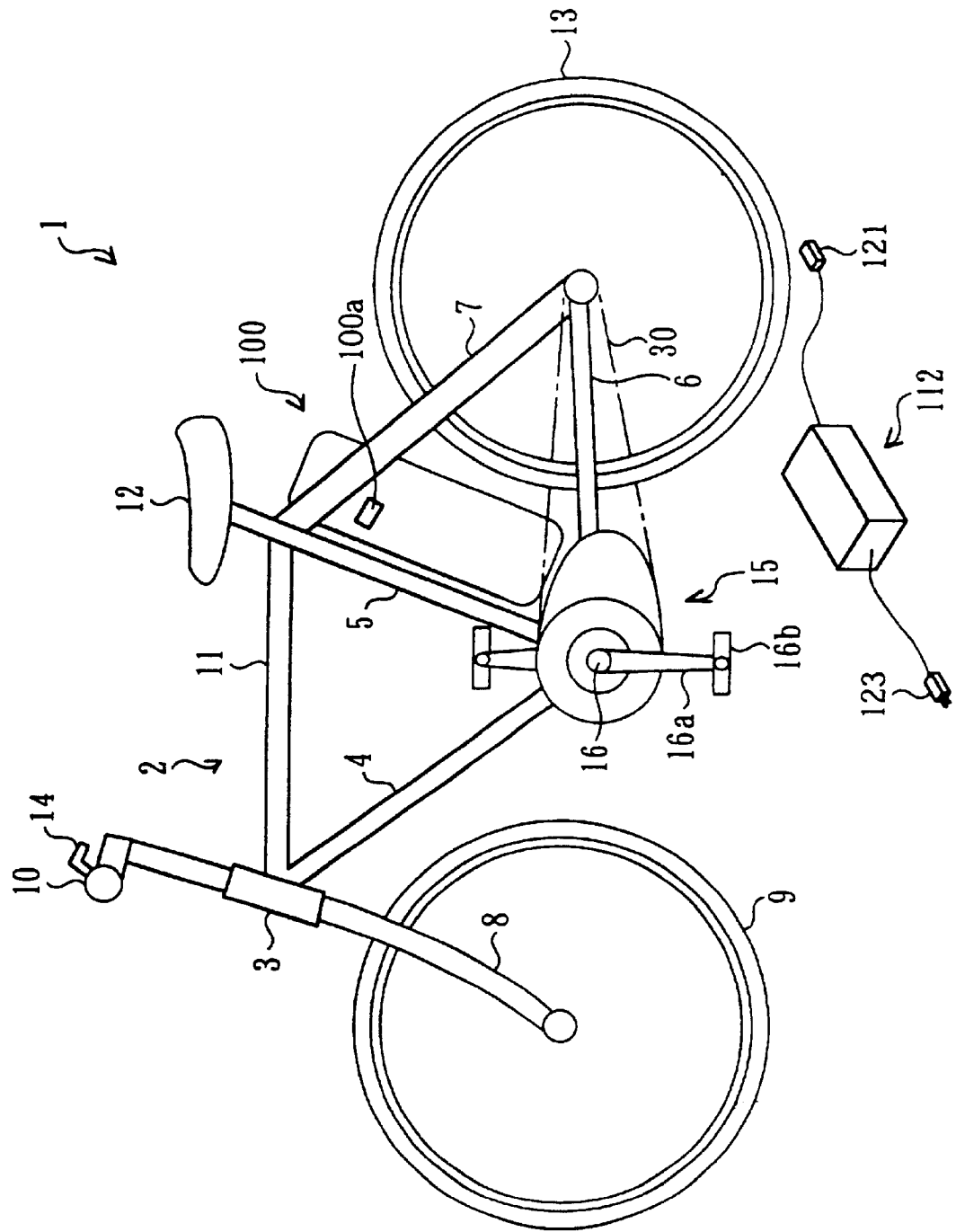
FIG. 1 is a side view of a motor-assisted bicycle according to a first embodiment of the present invention.

Embodiments of the present embodiment will be described below with reference to the accompanying drawings.

Referring to the figures, reference numeral 1 denotes a motor-assisted bicycle that serves as a motorized vehicle of which the electric power system of the present invention is constructed. A separate charging unit is shown juxtaposed to the vehicle. A removable battery casing 100 is mounted on the vehicle 1. The vehicle or bicycle includes a body frame 2 comprised of a head pipe 3, a down tube 4 that extends obliquely downward from the head pipe 3 toward the rear, a seat tube 5 that extends roughly upright from the rear end of the down tube 4, a pair of right-hand and left-hand chain stays 6 that extend roughly horizontally from the rear end of the down tube 4 toward the rear of the body, a pair of right-hand and left-hand seat stays 7 for connecting the rear end of both the chain stays 6 with the upper end of the seat tube 5 and a top tube 11 for connecting the head pipe 3 with the seat tube 5.

A front fork 8 is supported dirigibly mounted on the head pipe 3. A front wheel 9 is supported at the lower end of the front fork 8, and a steering handlebar 10 is fixed to the upper end of the front fork 8. A saddle 12 is mounted on the upper end of the seat tube 5. Further, a rear wheel 13 is journalled at the rear end of the chain stays 6.

Although not shown, a]n instrument panel (not shown) provided with a speedometer and other instruments on is provided at the center of the steering handlebar 10. This panel section may be provided with a display device (display means) for displaying the notification of refreshing discharge when decided to be necessary.

A lower portion of the body frame 2 is mounted with a power unit 15 that outputs a resultant force of a pedaling force (human strength) inputted to a pedal 16b via a crank arm 16a attached to both end projections of a crank shaft 16 for an assisting power proportional to the magnitude of the human strength from a built-in electric motor 17. That is, the magnitude of the pedaling force becomes a motor drive command 28. The output from this power unit 15 is transferred to the rear wheel 13 via a chain 30.

It is to be noted that the bicycle 1 of the present embodiment is further provided with a self-propelling lever 14 for externally inputting a motor drive command 28. Operating the self-propelling lever 14 also enables driving only by the power from the electric motor 17 without inputting a manual power to the pedal 16b.

A battery casing 100 that serves as a power source for the electric motor 17 and accessories is removably provided on the vehicle body so as to be extended along the rear surface of the seat tube 5 and interposed between the right-hand and left-hand seat stays 7. The battery casing 100 houses a rechargeable battery 102 constructed of a plurality of cells 101 connected in series. The battery casing 100 is provided with a temperature sensor 103 for detecting the temperature of the battery 102 and with an ammeter 104 for measuring the current value of the battery 102. Further, the battery casing 100 is provided with a battery control unit 105 for executing control and so on of the battery 102.

The battery casing 100 is automatically connected to the motor drive circuit 22 concurrently with the mounting thereof on the vehicle by way of connectors 107 and 108 (FIGS. 2 and 3) and automatically connected via communication interfaces 120a and 120b to a driving control section 109 for executing driving control of the motor-assisted bicycle 1 by way of connectors 110 and 111.

In a charging stage, the battery casing 100 is connected to the output side of the charging unit 112 that is not mounted on the vehicle 1 by way of connectors 113 and 114 regardless of whether the battery is removed from the vehicle body or remains mounted on the vehicle body. These connections to the charging unit 112 are made via communication interfaces 127 and 120c by way of connectors 115 and 116.

In FIG. 1, the reference numeral 100a denotes a charging inlet provided for the battery casing 100. The battery casing side terminals of the connectors 113, 114, 115 and 116 are placed in this inlet. The reference numeral 121 denotes a charging plug of the charging unit 112, and the charging unit terminals of the connectors 113 through 116 are placed in this plug. The plug can be inserted in the charging inlet 100a. The battery casing 100 and the charging unit 112 constitute the electric power system 21 of the present embodiment. The connectors 107 and 108 may be common to the connectors 113 and 114, while the connectors 110 and 111 may be common to the connectors 115 and 116.

The battery control unit 105 receives battery temperature data T from the temperature sensor 103, current value data I from the ammeter 104 and voltage data V of the battery 102 as inputs. The battery control unit 105 is provided with a battery management and control section 117 for executing control of refreshing discharge and other operations on the rechargeable battery 102 and an EEPROM 106 for storing specified data. There are further provided a display device (display means) 119 for displaying the remaining battery capacity and refreshing notification information by depressing a display button 118 when the display is necessary on the basis of a signal from the battery management and control section 117. Further provided are communication interfaces 120c and 120a for exchanging communications with the charging unit 112 and the driving control section 109. The display device 119 may be provided in the display panel section located on the vehicle side that is provided with a speedometer and so on.

The EEPROM 106 stores the specified data of (1) the number of times of charging, (2) the number of times of discharging, (3) the number of cycles of charging and discharging, counted from either the initial or preceding refreshing discharge, (4) the battery effective capacity of the battery 102, (5) the discharge capacity in the discharging stage, (6) the presence or absence of the execution of refreshing discharge after the display of the necessity of refreshing discharge and so on.

Then, the battery management and control section 117 decides whether or not the refreshing discharge is necessary on the basis of the battery conditions. The following conditions are examples, (1) the battery temperature, (2) voltage, (3) remaining capacity and so on of the battery 102. Also considered can be the battery histories of (1) the number of times of charging, (2) the number of times of discharging, (3) the number of cycles of charging and discharging, counted from either the initial or preceding refreshing discharge, (4) a difference between the battery effective capacity and the discharge capacity, (5) the presence or absence of the execution of refreshing discharge after the display of the necessity of refreshing discharge and so on. The battery management and control section 117 also functions so as to display the remaining battery capacity on the display device 119. The fact that the refreshing discharge is necessary may be displayed on the device 119.

The charging unit 112 is provided with a plug 123 that supplies an AC power to the charging unit 112 when connected to an outlet. This charging unit 112 is provided with an AC/DC (AC-to-DC) converter 124 that converts the AC power source supplied from the plug 123 into a DC power. The charging unit 112 also incorporates a voltmeter 125 and an ammeter 126 that measure the voltage value and the current value of the converter 124, a discharger (discharging means) 135 that executes the refreshing discharge of the rechargeable battery 102 and a charge/discharge control section 128 to which the measured values from the voltmeter 125 and the ammeter 126 and specified signals from the communication interface 127 are inputted.

The charging unit 112 is provided with a battery connection detecting section 129 that outputs to the charge/discharge control section 128 a connection signal representing the fact that this charging unit 112 is connected to the battery casing 100.

Further, the charging unit 112 is provided with a refreshing switch 131 that outputs a refreshing discharge command signal to the charge/discharge control section 128 when depressed by the user. This is done in the case where the information of the necessity of refreshing discharge is displayed on a display device 133 described later. The refreshing switch may also be provided on the battery casing 100 side as indicated by the reference numeral 137 in FIG. 2.

The output of the AC-to-DC converter 124 is controlled by the charge/discharge control section 128 via an output control section 132. The display device (display means) 133 and the discharger 135 are controlled by the charge/discharge control section (charge control means) 128. The display device 133 displays the information of waiting for charging, charging in operation, completion of charging, stop of charging, refreshing notification, refreshing in operation, completion of refreshing and so on. Among these, the refreshing notification may be concurrently displayed on the display device 119 provided on the battery casing 100 side.

Figure 2:
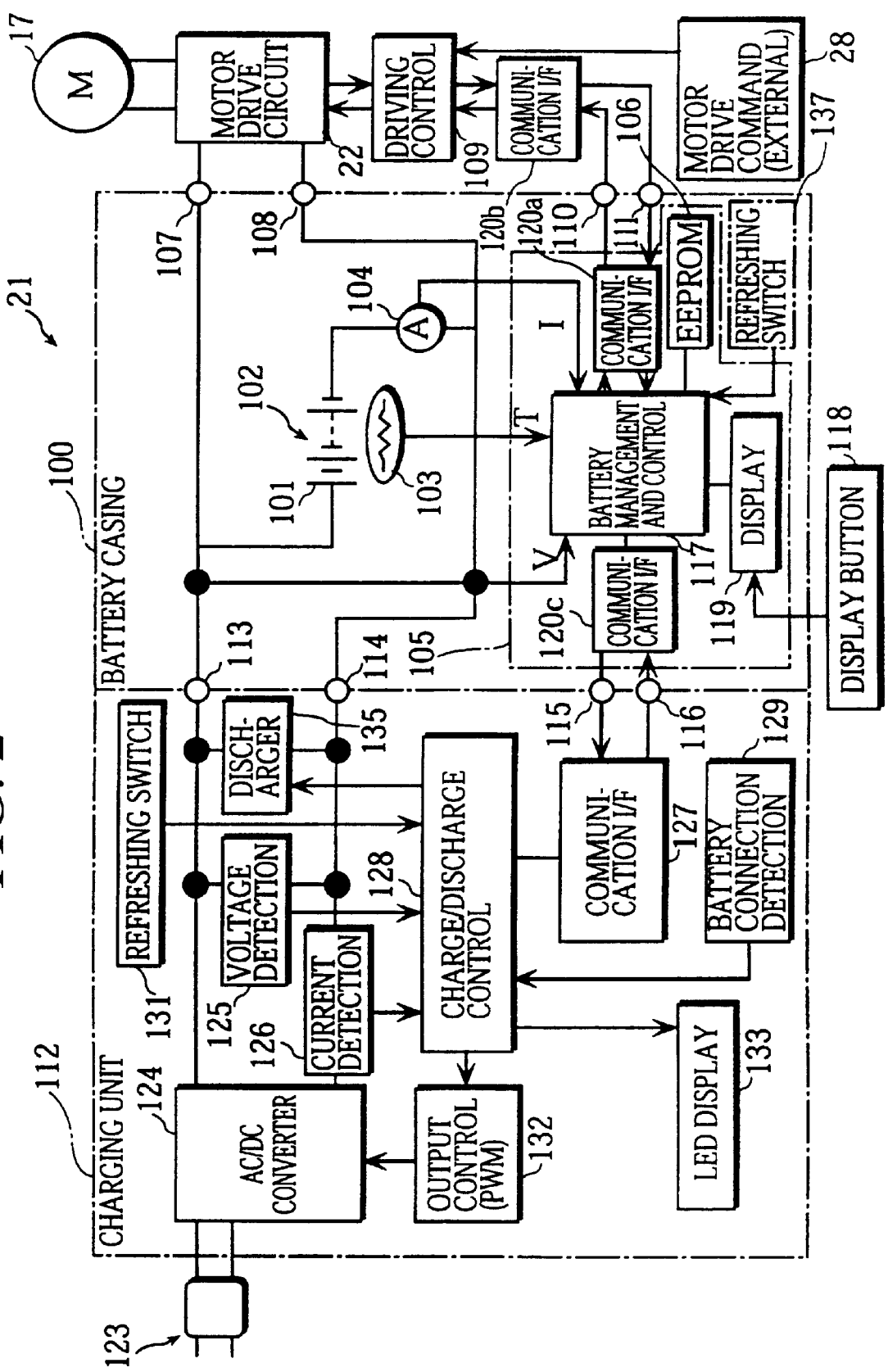
FIG. 2 is a block diagram of an electric power system of the first embodiment.
Figure 3:
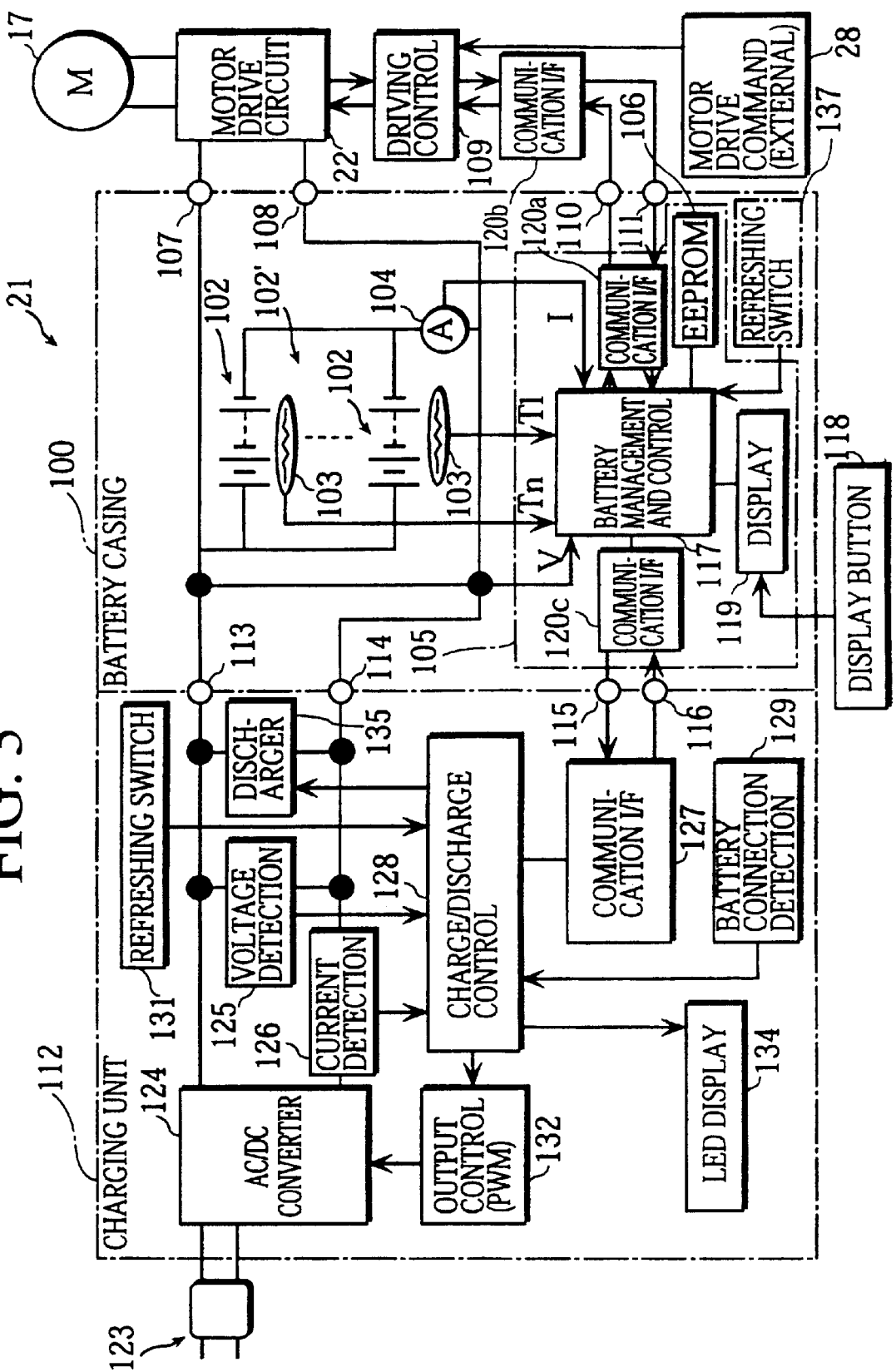
FIG. 3 is a block diagram showing a modification example of the above electric power system.

As shown in FIG. 3, if there is used a battery 102' constructed of a plurality of batteries 102, . . . , 102 connected in parallel, then there is a construction such that a plurality of temperature sensors 103, . . . , 103 for detecting the temperatures of the respective batteries 102 are provided. Detection values T1, . . . , Tn of the temperature sensors 103, . . . , 103 are inputted to the battery management and control section 117. In FIG. 3, the same reference numerals as those of FIG. 2 denote the same or corresponding components.

Next, signal data to be communicated between the battery control unit 105 of the motor-assisted bicycle 1 and the charging unit 112 will be described with reference to FIG. 4 through FIG. 6. It is to be noted that FIG. 4 through FIG. 6 indicate the numbers (Nos.) of the signal data and the contents of the signal data.

FIG. 4 shows charge and discharge control data to be collectively transmitted from the battery control unit 105 to the charging unit 112, the data including "refreshing notification" as an item 1, "refreshing discharge current value" as an item 2, "refreshing discharge stop voltage" as an item 3, "refreshing timer value" as an item 4, "charging start lower limit temperature" as an item 5 and "charging start upper limit temperature" as an item 6. It is to be noted that "presence" or "absence" is specifically indicated for the "refreshing notification" that functions as a signal for notifying the necessity or nonnecessity of refreshing discharge.

FIG. 5 shows battery state data to be collectively transmitted from the battery control unit 105 to the charging unit 112, the data including "battery temperature (1)" as an item 1, "battery temperature (2)" as an item 2, "battery voltage" as an item 3, "remaining battery capacity" as an item 4 and "effective battery capacity, i.e., the maximum capacity learned value at this stage" as an item 5. This maximum capacity learned value is the maximum capacity value at this stage during the transition of the maximum capacity. That is gradually varying (decreasing) in accordance with the gradual deterioration of the battery through the repetition of charging and discharging.

The battery temperature (1) is the battery temperature of the battery 102 singly provided as shown in FIG. 2, while the battery temperature (2) is the battery temperature of the second battery of a pair of batteries. As shown in FIG. 3, if the plurality of batteries 102 are provided as shown in FIG. 3, then battery temperatures (1) through (n) are included.

FIG. 6 shows the charger state data to be collectively transmitted from the charging unit 112 to the battery control unit 105. That data includes "charge and discharge control data request" as an item 1, "battery state data request" as an item 2, "refreshing in operation" as an item 3, "end of refreshing" as an item 4, "charging in operation" as an item 5, "waiting for charging" as an item 6, "completion of charging" as an item 7 and "stop of charging" as an item 8.

Figure 8:
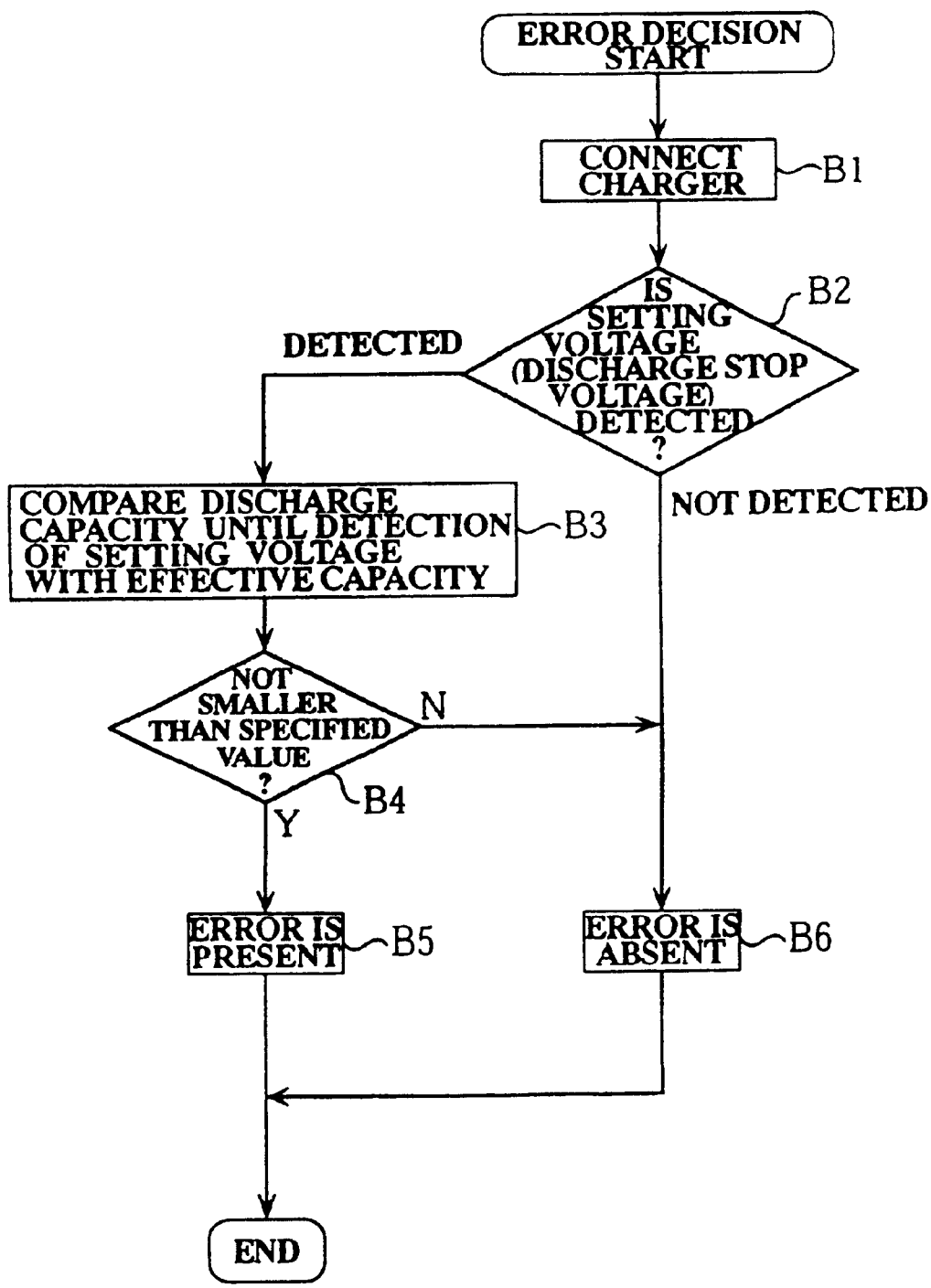
FIG. 8 is a flowchart for explaining the operation of the above battery control unit.
Figure 9:
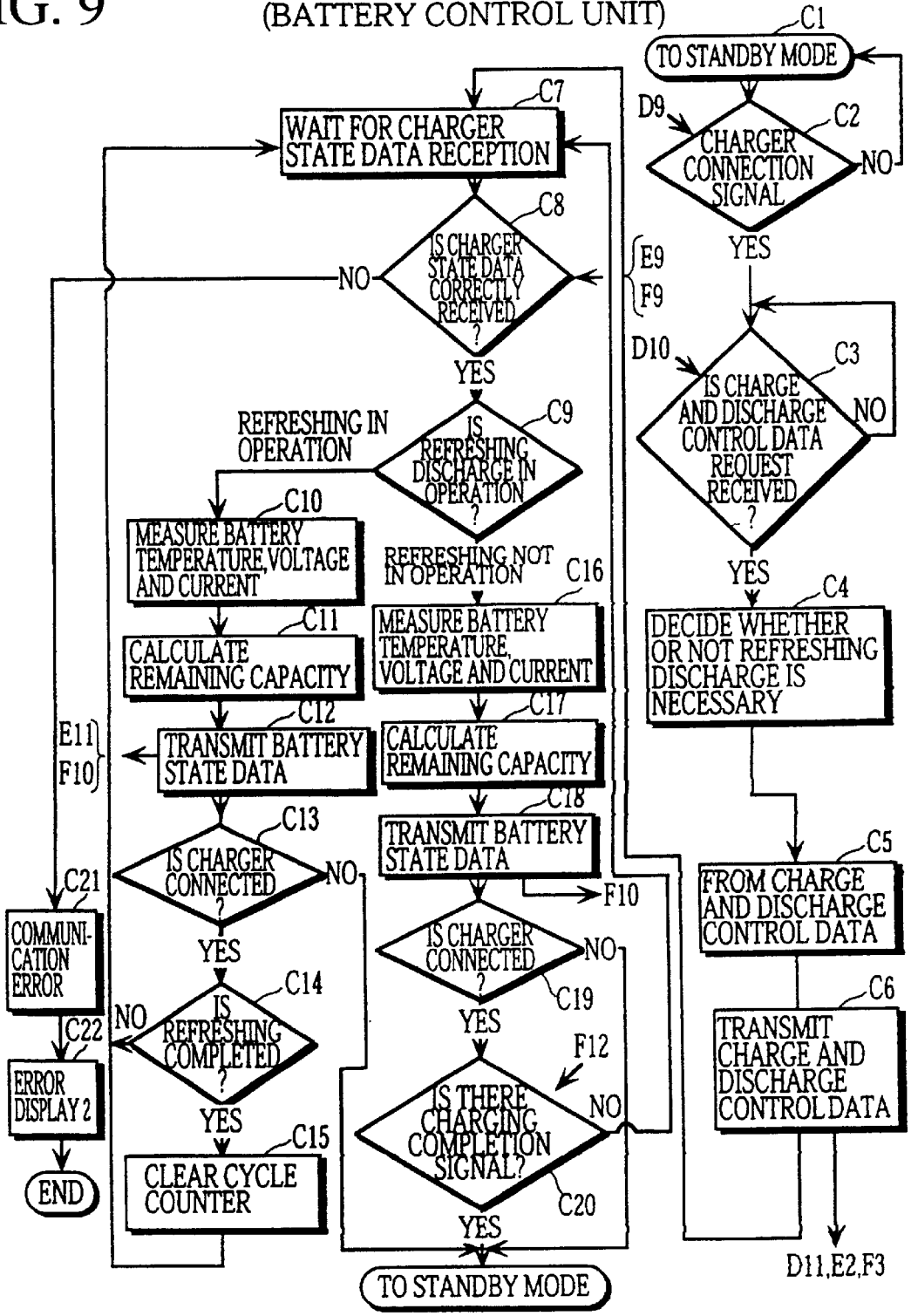
FIG. 9 is a flowchart for explaining the operation of the above battery control unit.
Figure 10:
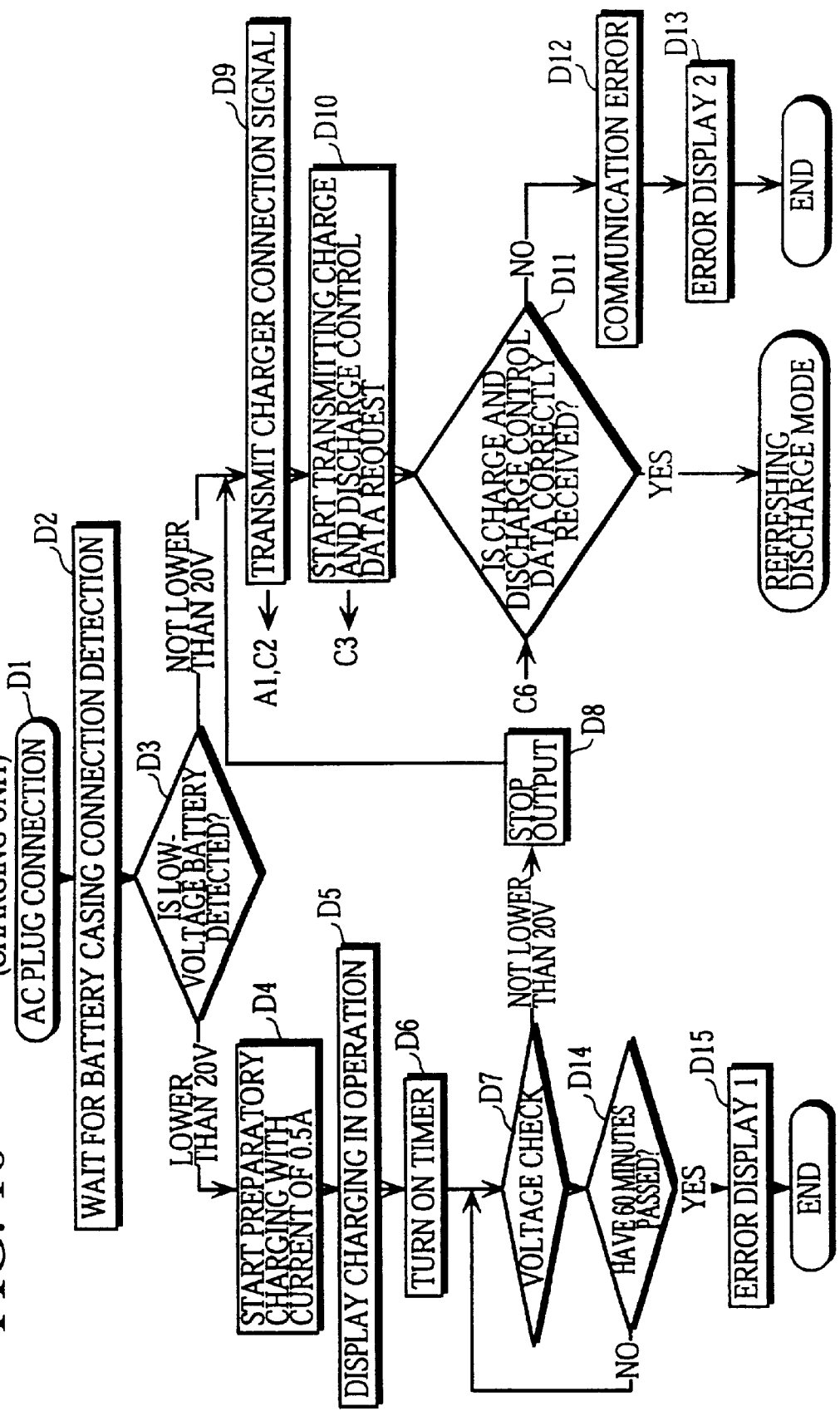
FIG. 10 is a flowchart for explaining the operation of the above charging unit.
Figure 11:
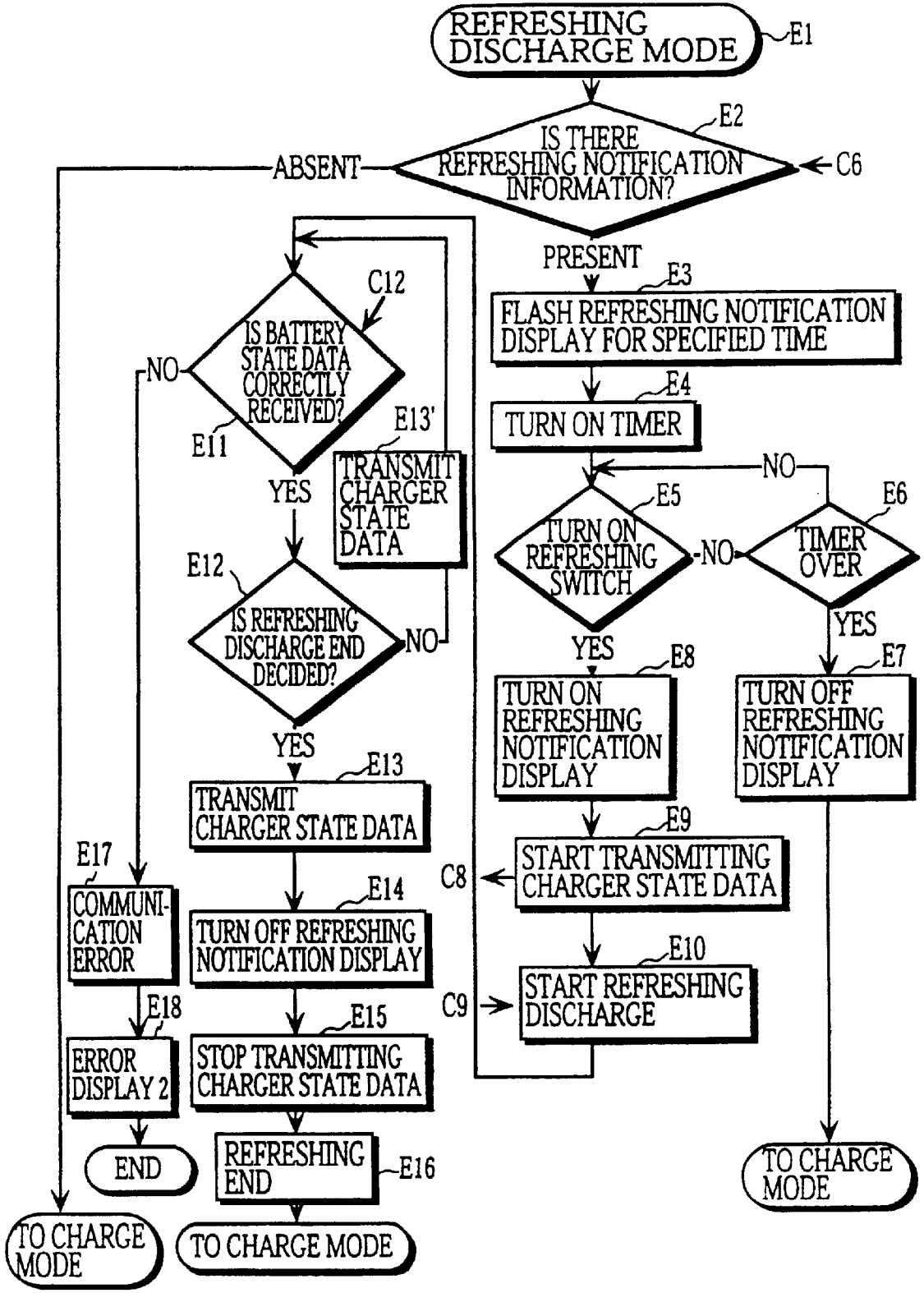
FIG. 11 is a flowchart for explaining the operation of the above charging unit.
Figure 12:
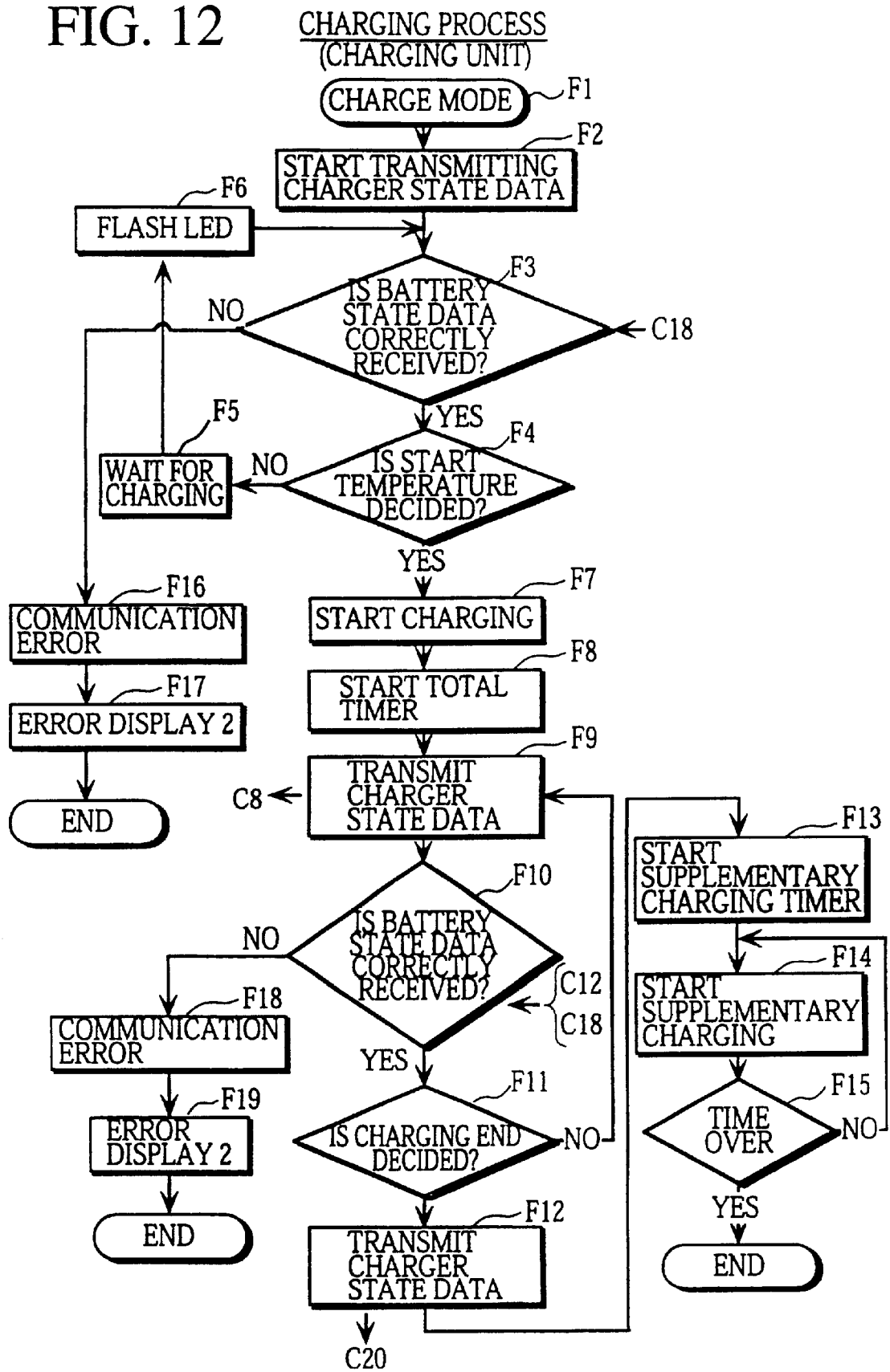
FIG. 12 is a flowchart for explaining the operation of the above charging unit.

Next, the operations of the battery control unit 105 and the charging unit 112 in the present electric power system 21 will be described on the basis of the flowcharts of FIG. 7 through FIG. 12. FIG. 7 through FIG. 9 show the operation of the battery control unit 105, while FIG. 10 through FIG. 12 show the operation of the charging unit 112. FIG. 7 shows a refreshing notification deciding process, FIG. 8 shows a discharge quantity error deciding process and FIG. 9 shows a refreshing notifying process.

As shown in FIG. 7, if a signal (D9) representing the fact that the charging unit 112 is connected to the battery control unit 105 is received by the battery control unit 105 (step A1), then the signal is first stored in the EEPROM of the battery control unit 105 in order to decide the presence or absence of a discharge history. It is decided whether or not there is a history of connection (discharge) to the vehicle. The history being changed according to the turning-on of the main switch of the vehicle (step A2). If the above-mentioned vehicle connection history exists, then the contents of a cycle counter for measuring the number of times of charge and discharge is incremented by one as the result of the decision indicating the presence of the discharge history (step A3. Then it is immediately decided whether or not the discharge quantity error exists in a discharge quantity error detection process (see FIG. 8) when no vehicle connection history exists (step A4).

If no discharge quantity error exists and the cycle counter indicates a value of not smaller than 20, then the "refreshing notification" of the rechargeable battery on the display means of the display device 133 is decided to be "provided" (step A6). Also charge and discharge control data of "1" as shown in FIG. 4 is formed (step A7). If the cycle counter value is smaller than 20 in step A5, then the "refreshing notification" is decided to be "not provided" (step A8), and the process of step A7 is executed.

The decision of the discharge quantity error in the aforementioned step A4 is executed as shown in FIG. 8.

The charging unit 112 is connected to the battery control unit 105 (step B1). If a history of the detection of a certain setting voltage or, for example, a discharge stop voltage is stored in the battery control unit 105 in the preceding discharging stage (step B2), then the capacity of discharge until the detection of the discharge stop voltage stored in the battery control unit 105 is compared with the effective capacity varied by the deterioration of the rechargeable battery in a similar manner (step B3). If a difference between the two compared values is not smaller than a specified value (step B4), then it is decided that an error exists (step B5). It is decided that no error exists when the discharge stop voltage is not detected or the difference between the two is smaller than the specified value (step B6).

Next, the refreshing notifying process of the battery control unit will be described with reference to FIG. 9.

If the battery control unit 105 is in a standby mode (step C1), a charger connection signal is detected by the interruption of a connection signal (D9) described later (step C2) and a "charge and discharge control data request" signal (D10) that is transmitted from the charging unit 112 and indicated by the item No. 1 in FIG. 6 is received (step C3). Then the battery control unit 105 (1) decides whether or not the refreshing discharge is necessary (step C4), (2) forms charge and discharge control data (step C5) and (3) transmits the charge and discharge control data shown in FIG. 4 from the battery control unit 105 to the charging unit 112 (step C6).

It is to be noted that the decision on the necessity of the refreshing discharge in the step C4 is made on the basis of (1) the number of times of charging, (2) the number of times of discharging, (3) the number of cycles of charging and discharging, which are counted from the initial or preceding refreshing discharge, (4) the presence or absence of the execution of refreshing discharge after the preceding display of the necessity of refreshing discharge or the difference between the discharge capacity and the effective capacity by the time of detection of the discharge stop voltage. It is decided that the refreshing discharge is necessary, for example, when the number of cycles of charge and discharge is not smaller than 20 and when the refreshing discharge is not executed after the display of the necessity of refreshing discharge.

Next, the reception of the "charger state data" signal of FIG. 6 is awaited (step C7). If this signal is correctly received (step C8), then it is decided whether or not a signal representing the refreshing discharge in operation is included in the charger state data (step C9). If the refreshing is in operation, then (1) the battery temperature, voltage and current are measured (step C10), (2) the remaining capacity of the battery is calculated (step C11), and (3) the battery state data shown in FIG. 5 is transmitted to the charging unit 112 (step C12).

Then, if the charging unit 112 is connected to the battery control unit 105 (step C13) and a refreshing discharge end signal is received as the charger state data of FIG. 6 from the charging unit 112, then the aforementioned cycle counter is cleared to zero (steps C14 and C15). Then the program flow proceeds to step C7. It is to be noted that the end of refreshing discharge is decided on the charging unit 112 side on the basis of the voltage data V of the battery 102.

If it is decided that the refreshing is not in operation according to the signal inside the charger state data of FIG. 6 in the aforementioned step C9, then the battery temperature, voltage and current are measured (step C16). The remaining capacity of the battery is calculated (step C17), and the battery state data shown in FIG. 5 is transmitted to the charging unit 112 (step C18).

If the charging unit 112 is connected to the battery control unit 105 (step C19) and the charging completion signal from the "charger state data" of FIG. 6 is detected (step C20), then the program flow proceeds to the standby mode of step C1. If the connection of this battery control unit 105 with the charging unit 112 is not detected in step C13 and step C19, then the program flow also proceeds to the standby mode of step C1.

When the "charger state data" signal is not correctly received in step C8, then it is decided that a communication error occurs (step C21) and the processing of error display 2 is executed (step C22) to display a specified display such as alternate flashing on the display device 133.

Next, the operation after the connection of the AC plug of the charging unit 112 in a charging preparation stage will be described with reference to FIG. 10. If the AC plug 123 of the charging unit 112 is connected to the outlet (step D1), then the detection of connection to the battery casing 100 is awaited (step D2).

If the connection is detected (step D2) and the voltage V of the rechargeable battery 102 is lower than 20 V (step D3), then preparatory charging with a charge current of 0.5 A is started (step D4) and [the fact] that the charging is in operation is displayed on the display device 133 (step D5). A timer is turned on to measure the charging time (step D6).

If the voltage V of the rechargeable battery 102 becomes equal to or higher than 20 V (step D7), then the charging output is stopped (step D8). Then the charger connection signal received in steps A1 and C2 are transmitted from this charging unit 112 to the battery control unit 105 (step D9).

If the transmission of the "charge and discharge control data request" that is received in step C3 and shown in FIG. 6 is started (step D10) and the charge and discharge control data transmitted in step C6 is correctly received (step D11), then the program flow proceeds to a refreshing discharge mode described later.

If the charge and discharge control data is not correctly received in step D11, then it is decided that a communication error occurs (step D12). Then the processing of error display 2 is executed (step D13), ending this processing.

If the state in which the voltage is not higher than 20 V continues for 60 minutes in step D7 (step D14), then the processing of error display 1 is executed (step D15), ending this processing.

Next, the operation of the charging unit 112 in the refreshing discharge mode will be described with reference to FIG. 11.

If the charging unit 112 is in the refreshing discharge mode (step E1) and the "refreshing notification" signal is included in the charge and discharge control data that has been formed in step C5 and shown in FIG. 4 (step E2), then, for example, an LED constituting the display device 133 flashes for a specified time to indicate that the refreshing discharge is necessary (display of refreshing notification) (step E3). Also, the timer is turned on to start the measurement of the elapsed time (step E4). If the "refreshing notification" signal is not included in the charge and discharge control data in step E2, then the program flow proceeds to a charge mode described later.

If the refreshing switch 131 is not turned on within a specified time from the start of measurement in step E4, then it is decided that time over occurs (steps E5 and E6) and the flashing of the LED 133 is turned off (step E7). The program flow proceeds to the charge mode described later. This can eliminate the refreshing discharge and reduce the charging time in an urgent or similar case.

If the refreshing switch 131 is turned on within a specified time in step E5, then the flashing of the LED 133 is stopped and the refreshing notification display is turned on (step E8). The charger state data including the "charge and discharge control data request" signal that has been received in step C8 and shown in FIG. 6 is transmitted from the charging unit 112 to the battery control unit 105 (step E9) to start the refreshing discharge of the battery 102 (step E10).

If the battery state data that has been transmitted in step C12 and shown in FIG. 5 is correctly received (step E11) and it is decided that the refreshing discharge is ended on the basis of the data contents (step E12), then the end of refreshing (item No. 4 in FIG. 6) is transmitted as charger state data (step E13). Also, the LED 133 is turned off (step E14). The transmission of the "charger state data" that has started to be transmitted in step E9 is stopped (step E15) to end the refreshing discharge (step E16), and the program flow proceeds to the charge mode described later.

If the battery state data is not correctly received in step E11, then it is decided that a communication error occurs (step E17) and the processing of error display 2 is executed (step E18) to end this processing. If a decision to end the refreshing discharge is not made in step E12, then the refreshing in operation (item No. 3 in FIG. 6) is transmitted (step E13').

Next, the operation in the charge mode of the charging unit 112 will be described with reference to FIG. 12.

If this charging unit 112 enters into the charge mode (step F1), then the charger state data including the "battery state data request" signal shown in FIG. 6 starts to be transmitted from the charging unit 112 to the battery control unit 105 (step F2). If the battery state data that has been transmitted from the battery control unit 105 and shown in FIG. 5 is correctly received in step C18 (step F3), then it is decided whether or not the battery temperature in this battery state data is within a charging start temperature of a charging temperature range set in the charge and discharge control data (step F4). If the temperature is not within the charging start temperature, then the charging is awaited (step F5) and the LED 133 flashes as a charge standby display (step F6). The program flow proceeds to step F3.

If it is decided that the battery temperature is within the charging start temperature in step F4, then the charging is started (step F7). Also, the measurement of the elapsed time by the total timer is started (step F8) to transmit the charger state data including the "battery state data request" signal shown in FIG. 6 from this charging unit 112 to the battery control unit 105 (step F9). If the battery state data that has been transmitted from the battery control unit 105 in the aforementioned step C12 and shown in FIG. 5 is correctly received (step F10), then it is decided whether or not the charging is ended (step F11). If it is decided that the charging is not ended, then the program flow returns to step F9 to repeat the steps F9 through F11.

If it is decided that the charging is ended in step F11 according to the received battery state data, then the charger state data including either the item No. 7 of "completion of charging" signal that has been received in step C20 and shown in FIG. 6 or the item No. 8 of "stop of charging" signal is transmitted from this charging unit 112 to the battery control unit 105 (step F12). Then the measurement of the elapsed time by a supplementary charging timer is started (step F13). The supplementary charging (for example, 0.5 A×2 h) is started (step F14) and the supplementary charging is stopped after a lapse of a specified time, ending this processing.

If the battery state data that has been transmitted from the battery control unit 105 and shown in FIG. 5 is not correctly received in step F3 or step F10, then it is decided that a communication error occurs (steps F16 and F18), and the processing of error display 2 is executed (steps F17 and F19), ending this processing.

According to the present embodiment described above, the battery control unit 105 decides whether or not the refreshing discharge is necessary according to the state of the rechargeable battery 102. If it is decided that the refreshing discharge is necessary, then the refreshing notification information is transmitted from the battery control unit 105 via a communication interface 127 to the charge/discharge control section 128 that controls the discharger 135 of the charging unit 112, displaying the refreshing notification on the display device 133. If the user selects the refreshing discharge by depressing the refreshing switch within a specified time after the display, then the refreshing discharge is executed. Thus the refreshing discharge execution timing can be optimized while substantially obviating the need for the user to decide whether or not the refreshing discharge is necessary. This is because the user is informed of the necessity of refreshing by means of the display of the refreshing notification and the refreshing discharge is not executed even though the user depresses the refreshing switch in the absence of the display of the refreshing notification. This increases the frequency of refreshing discharge, enabling the prevention of the deterioration of the battery. Even though the refreshing notification is displayed, the program flow proceeds to the charge mode unless the refreshing switch is depressed, which is convenient at the demand of quick charging.

In this case, with regard to the decision of the necessity of the refreshing discharge, it is decided that the refreshing discharge is necessary when (1) the number of times of charging, (2) the number of times of discharging, (3) the number of cycles of charging and discharging, which are counted from the initial or preceding refreshing discharge is not smaller than the specified value and (4) when an error not smaller than a specified quantity exists between the battery effective capacity and the capacity of discharge until the specified voltage. This arrangement can prevent the deterioration of the battery due to the excessive frequency of refreshing discharge. It is decided that the refreshing discharge is necessary also when the refreshing discharge is not executed after the display of the necessity of the preceding refreshing discharge. This arrangement can therefore prevent the reduction in travelable distance due to the memory effect as a consequence of the excessively low frequency of refreshing discharge.

According to the first embodiment, the electric power system 21 has the battery casing 100 and the charging unit 112 separately provided, the charging unit 112 being not mounted on the vehicle and the battery casing 100 being removably mounted on the vehicle. However, it is acceptable to provide the charging unit 112 and the battery casing 100 in the form of separable units and mount these units removably on the vehicle body. In either case, the charging unit 112 and the battery casing 100 are to be connected to each other by way of a connector. According to the electric power system of the present invention, the battery casing and the charging unit may be completely integrated with each other and removably mounted on the vehicle body. It is also acceptable to mount the rechargeable battery and the charging unit in a fixed manner (regularly mounted) on the vehicle and merely connect the plug to an outlet in the charging stage.

Figure 13:
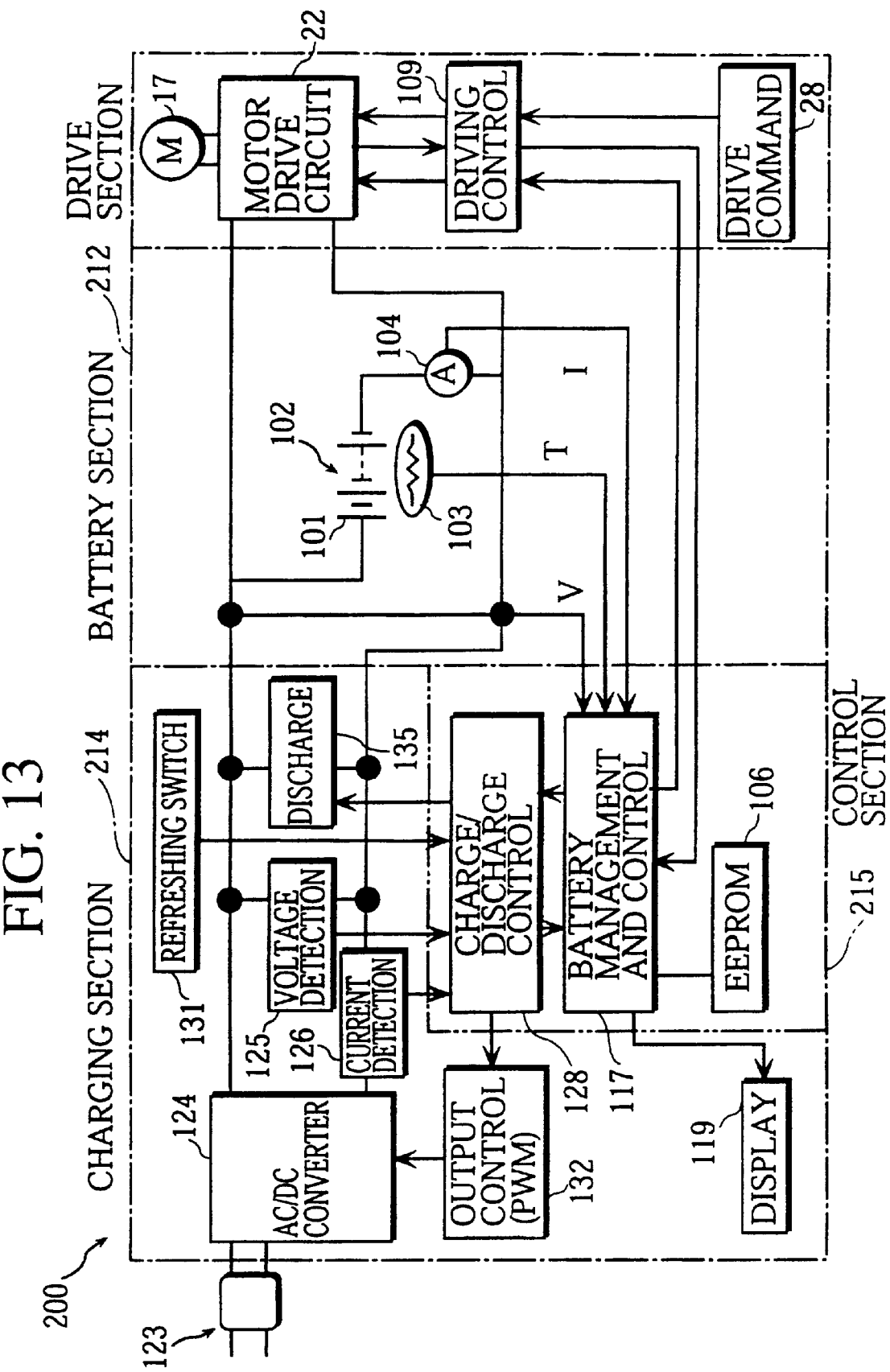
FIG. 13 is a block diagram of an electric power system according to a second embodiment of the present invention.
Figure 14:
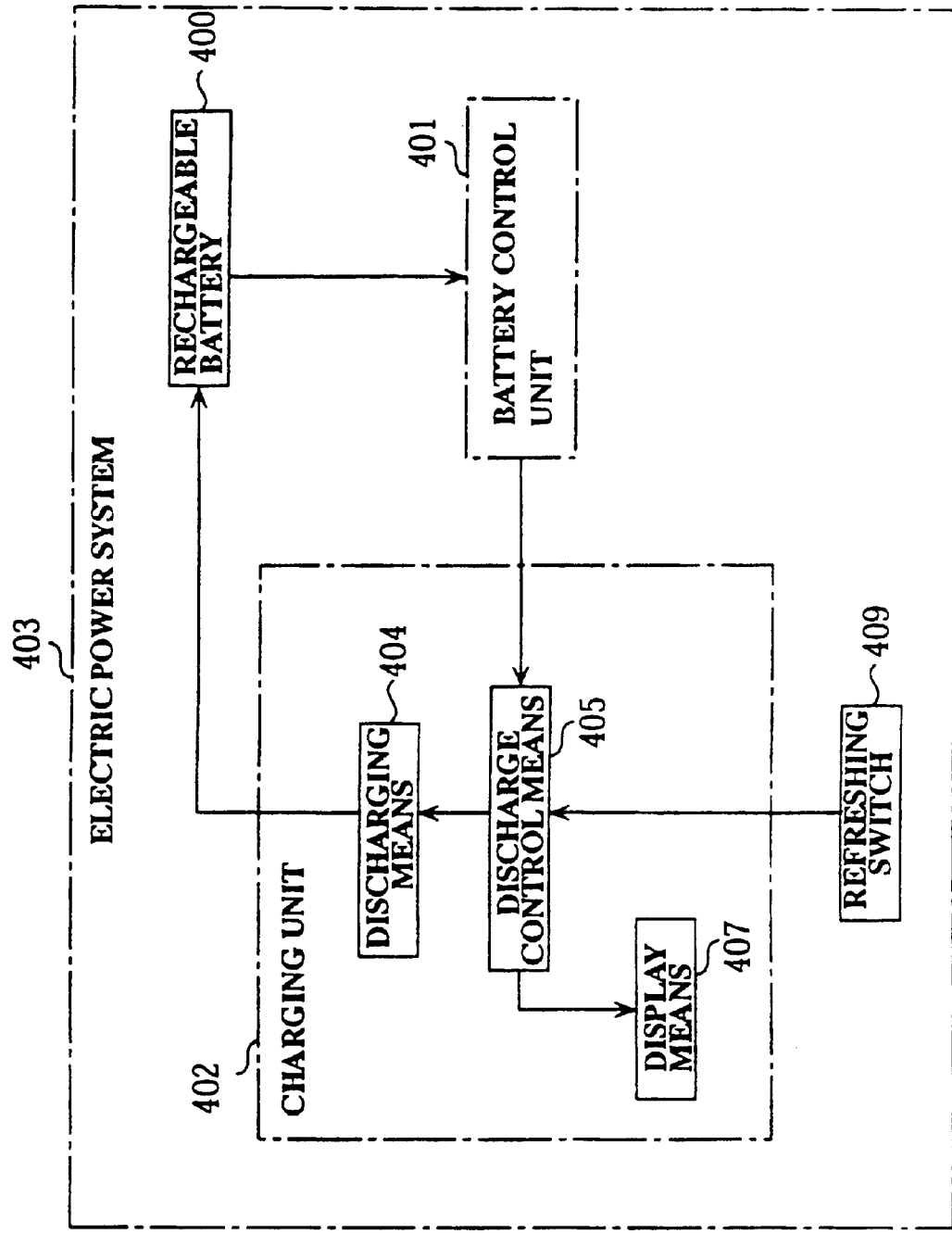
FIG. 14 is a schematic diagram of the present invention.

FIG. 13 shows a second embodiment intended for, for example, a motor scooter in which a rechargeable battery and a charging unit are mounted in a fixed manner (regularly mounted) on the vehicle body. An electric power system 200 of the present second embodiment is provided with a battery section 212 provided with a battery 102 constructed of a plurality of battery cells 101 connected in series, a charging section 214 for charging the battery 102 and a control section (ECU) 215 for executing charging control and refreshing discharge control by means of the charging section 214.

The control section 215 has a charge/discharge control section 128 that receives measurement values from an ammeter 126 and a voltmeter 125 connected to the output side of an AC/DC converter 124. A discharge command from the refreshing switch 131 inputs and controls an output control section 132. A discharger 135 and a battery management and control section 117 receives a voltage value V of a battery 102, a temperature detection value T from a temperature sensor 103 and a battery current value I from an ammeter 104 as inputs. There is further provided a driving control section 109 that receives an external drive command 28 of, for example, a command from a throttle grip and controls the motor drive circuit 22.

Figure 15:
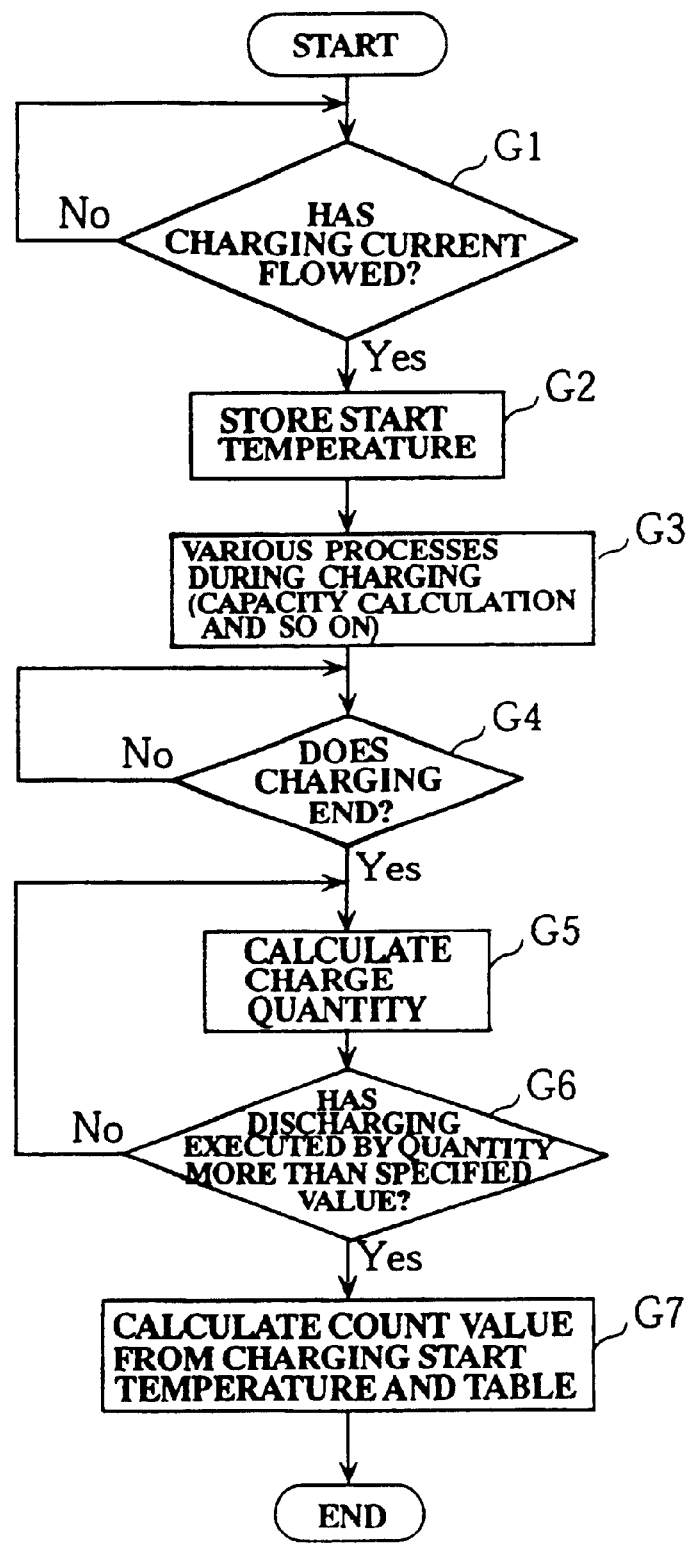
FIG. 15 is a flowchart for explaining the operation of a battery control unit according to a third embodiment of the present invention.
Figure 16:
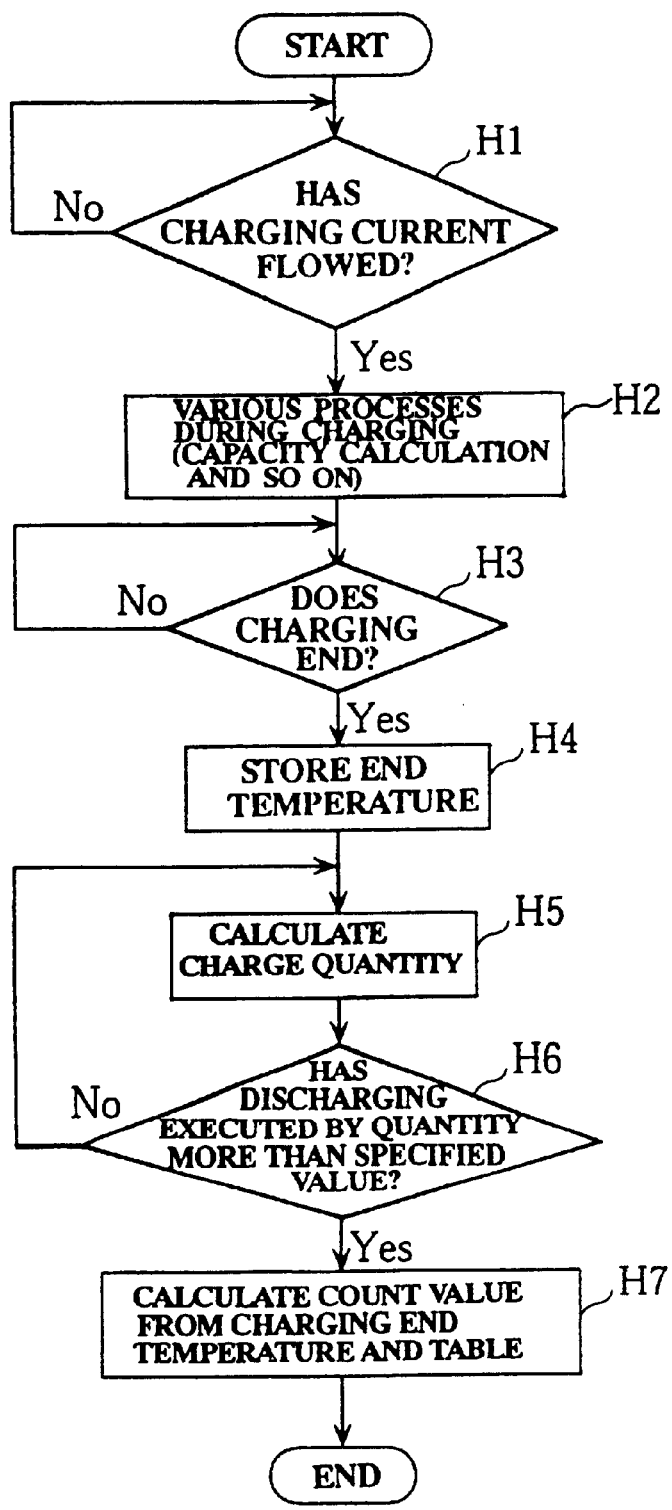
FIG. 16 is a flowchart for explaining the operation of the battery control unit of the third embodiment.
Figure 17:
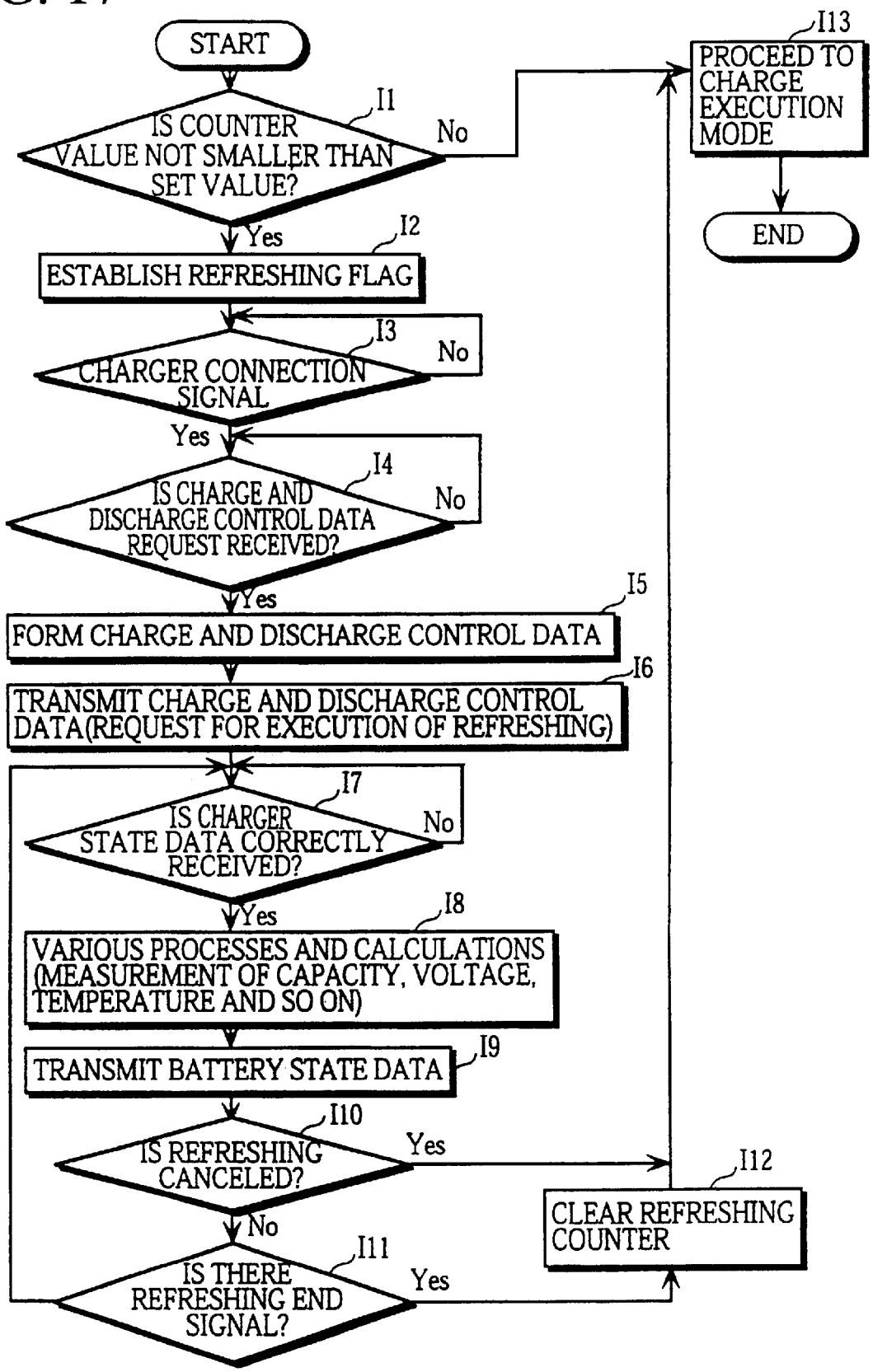
FIG. 17 is a flowchart for explaining the operation of the battery control unit of the third embodiment.

FIG. 15 through FIG. 17 are flowcharts for explaining a third embodiment. The present third embodiment is an example for deciding whether or not the refreshing discharge is necessary by means of the battery control unit 105 of FIG. 2. That is, according to this example, when deciding whether or not the refreshing discharge is necessary on the basis of the number of times of charging counted from the preceding refreshing discharge, the number of times of charging is weighted by the battery temperature at the time of starting charging or at the time of ending charging.

Specifically, the present third embodiment counts the "number of times of charging" by the "charging and discharging cycle", i.e., it does not count the number of times of charging until discharging is effected in excess of a specified quantity after the end of charging. If the battery temperature at the time of starting charging or at the time of ending charging exceeds a specified value of, for example, 20° C. at the time of counting, one charging operation (charging and discharging cycle) is counted as one-and-a-half or two charging operations. If the count value comes to have a specified value of, for example, not smaller than 20, then it is decided that the refreshing discharge is necessary, and the refreshing discharge is automatically executed with the display of refreshing in operation on the display device provided for the charger.

The weighting based on the battery temperature at the time of starting charging is appropriate for, for example, the Ni—MH battery of which the charging is a heat generating reaction in terms of the battery characteristics and in which the battery temperature is increased by charging and the temperature at the time of ending charging is scarcely influenced by the environmental temperature. The weighting based on the battery temperature at the time of ending charging is appropriate for, for example, the Ni—Cd battery of which the charging is a heat absorbing reaction in terms of the battery characteristics and in which the battery temperature is not increased by charging.

If it is decided that charging is started upon deciding whether or not a charge current has flowed in FIG. 15 that shows the case where the weighting is executed attaching importance to the battery temperature at the time of starting charging, then the battery temperature at the time of starting charging is read and stored (steps G1 and G2) and various processes during charging (for example, capacity calculation) are executed (step G3).

Then, it is decided whether or not the charging including the supplementary charging has ended on the basis of the charge capacity characteristic curve and so on (step G4). If it is decided that the charging has ended, then the discharge capacity due to the subsequent driving and so on is calculated. If the discharge capacity becomes equal to or higher than a specified value, then it is decided that one charging and discharging cycle has completed. The count value of the number of times of charging subsequent to the weighting is calculated on the basis of the stored temperature at the time of starting charging and a weighting table (steps G5 through G7). Specifically, if the battery temperature T (°C.) at the time of starting charging is T≦20, 20<T≦30 and T>30, one charging operation (charging and discharging cycle) is counted as one, one-and-a-half and two charging operations, respectively. The battery temperature, the count value and so on of the weighting are appropriately set on the basis of the battery characteristics.

If it is decided that charging has started upon deciding whether or not a charge current has flowed in FIG. 16 shows the case where the weighting is executed attaching importance to the battery temperature at the time of ending charging, then various processes during charging (for example, capacity calculation) are executed (steps H1 and H2), and it is decided whether or not the charging has ended on the basis of the charge capacity characteristic curve and so on (step H3).

If it is decided that the charging has ended, then the battery temperature at the time of ending charging is read and stored (step H4), and the discharge capacity is subsequently calculated. If the discharge capacity becomes equal to or higher than a specified value, then it is decided that one charging and discharging cycle has been completed, and the count value of the number of times of charging weighted on the basis of the stored temperature at the time of ending charging and a weighting table is calculated (steps H5 through H7). It is to be noted that, for example, the weighting table based on the battery temperature at the time of starting charging can be commonly used as the weighting table based on the battery temperature at the time of ending charging. It is, of course, acceptable to adopt another weighting table depending on importance attached to the charging start temperature or to the charging end temperature.

In FIG. 17 that shows the flow of deciding whether or not the refreshing discharge to be executed inside the battery control unit is necessary, it is decided whether or not the count value of the weighted number of times of charging is not smaller than a specified value set so as to execute refreshing discharge (step I1). If the value has not reached the specified value, then the program flow proceeds to the charge mode (step I13), and a refreshing flag is established when the value becomes equal to or higher than the specified value (steps I1 and I2). If there is a request for charge and discharge control data from the charger side when the battery is subsequently connected to the charger, then charge and discharge control data (refreshing discharge requirement signal) is formed and transmitted to the charger side (steps I3 through I6).

If the refreshing discharge requirement signal is received on the charger side, then the refreshing discharge is automatically executed, and the display of the refreshing discharge in operation is executed.

When the charger state data is correctly received (step I7), then various processes and calculations (measurement of battery capacity, voltage, temperature and so on) are executed. If there is a subsequent battery state data request from the charger, then the requested battery state data is transmitted from the battery control unit 105 (steps I8 through I9). If the refreshing discharge is artificially canceled by an input from the refreshing cancel switch, then the program flow proceeds to a charge execution mode (steps I10 and I13). If the refreshing discharge is not canceled, then the refreshing counter is cleared upon the transmission of a refreshing end signal, and the program flow proceeds to the charge execution mode (steps I10 through I12).

According to the present third embodiment described above, the weighting of the number of times of charging is executed on the basis of the battery temperature at the time of starting charging or the battery temperature at the time of ending charging, and it is decided that the refreshing discharge is necessary when the weighted number of times of charging becomes equal to or higher than the specified value. This arrangement can make it possible to decide whether or not the refreshing is necessary in efficient correspondence with the battery characteristics that the degree of the memory effect is greater than that in the case where the temperature is low in the charging and discharging cycle in the state in which the battery temperature is high and is able to more reliably prevent the occurrence of the memory effect.

The number of times of charging is not counted until the discharging in excess of the specified quantity is executed after the end of charging. This arrangement can prevent the decision that the refreshing discharge is necessary when the battery that is actually not discharged is repetitively charged and is able to prevent the reduction in the battery performance due to the excessive refreshing discharge.

According to the motorized vehicle power system 403 of the present invention, the discharging means 404 for executing the refreshing discharge of the rechargeable battery 400 is controlled on the basis of the refreshing discharge requirement signal from the battery control unit 401. This arrangement enables the execution of the refreshing discharge in accordance with the optimum timing and is able to prevent the reduction in the cruising range attributed to the deterioration of the battery due to the excessive refreshing discharge and the memory effect due to the excessively little refreshing discharge.

The refreshing discharge is enabled by the discharging means 404 only when the charging unit 402 receives the refreshing discharge requirement signal from the battery control unit 401. This arrangement can avoid the problem of the occurrence of the deterioration of the battery due to the excessively high frequency of refreshing discharge.

The necessity of refreshing discharge is displayed on the display means 407 when decided to be necessary. Therefore, the user can be informed of the decision of the refreshing time, and the battery can be subjected to refreshing discharge only when needed. This arrangement can avoid the problem of the occurrence of the deterioration of the battery due to the excessively high frequency of refreshing discharge.

In the case where the necessity of refreshing discharge is displayed, the refreshing discharge is executed and thereafter charge is executed when the refreshing switch 409 is turned on within a specified time or the charge is executed when the refreshing switch is not turned on. The refreshing discharge is automatically started when the refreshing discharge requirement signal is received. However, the refreshing discharge is stopped and charge is executed when the refresh cancel switch is turned on during the refreshing discharge. Therefore, if there is no time margin due to an urgent business even when the refreshing discharge is necessary, then the charge can be immediately started while skipping the refreshing discharge, allowing the system to fully cope with the user's request.

It is decided whether or not the refreshing discharge is necessary on the basis of at least any one of the number of times of charging, the number of times of discharging, the number of cycles of charging and discharging, which are counted from the initial or preceding refreshing discharge. It is decided whether or not the refreshing discharge is necessary when a difference larger than a specified quantity exists between the battery effective capacity perceived by the battery control unit 401 and the discharge capacity down to the specified setting voltage. Therefore, the decision of the refreshing time can be more correctly made without bothering the user to spend time and effort on the decision making, and the problem of the occurrence of the deterioration of the battery due to the excessively high frequency of refreshing discharge can be avoided.

It is decided that the refreshing discharge is necessary when the refreshing discharge is not executed until the completion of refreshing after the preceding display of the necessity of refreshing discharge. Therefore, the refreshing discharge is reliably executed when the refreshing discharge is not executed at all although the refreshing discharge is decided to be necessary or when the refreshing is effected partway due to the power cable pulled out of the power source during refreshing discharge, and this can prevent the occurrence of the memory effect due to the excessively low frequency of refreshing discharge.

The weighting of the number of times of charging is executed on the basis of at least either one of the battery temperature at the time of starting charging or the battery temperature at the time of ending charging. According to the claim 10 of the present invention, the weighting is increased as the battery temperature increases, and it is decided that the refreshing discharge is necessary when the weighted number of times of charging becomes equal to or higher than the specified value. This arrangement can make it possible to decide whether or not the refreshing is necessary in efficient correspondence with the battery characteristics that the degree of the memory effect is greater than that in the case where the temperature is low in the charging and discharging cycle in the state in which the battery temperature is high and is able to more reliably prevent the occurrence of the memory effect.

The number of times of charging is counted when discharging is executed after the charging. This arrangement can prevent the decision that the refreshing discharge is necessary when the battery that is actually not discharged is repetitively charged and is able to prevent the reduction in the battery performance due to the excessive refreshing discharge.

The removable battery casing of the type mounted on the vehicle and the charging unit of the type that is mounted on or not mounted on the vehicle are provided and the removable battery casing has the battery control unit 401 built-in. With this arrangement, the same charging unit can be used even if the vehicle is changed or the rechargeable battery is changed, and the components can be commonly used.

The rechargeable battery 400, the battery control unit 401 and the charging unit 402 are mounted on the vehicle in a fixed manner. This arrangement obviates the need for the connection of the battery control unit with the charging unit during the charging and discharging operations and facilitates the work.

What is claimed is:

1. A motorized vehicle power system provided with a rechargeable battery, a battery control unit for executing control of battery conditions, a charging unit for charging said rechargeable battery, said charging unit being provided with a discharging means for executing a refreshing discharge of said rechargeable battery, said charging unit including a discharge control means for controlling said refreshing discharge executed by said charging device, said battery control unit including means for detecting a remaining capacity of said rechargeable battery based on signals transmitted from said battery through said charging unit and transmitting a refreshing discharge requirement signal to said charging unit for effecting a refreshing discharge.

2. A motorized vehicle power system as claimed in claim 1, wherein
the discharge control means of the charging unit controls the discharging means so as to enable refreshing discharge by the discharging means only when the refreshing discharge requirement signal is received from the battery control unit.

3. A motorized vehicle power system as claimed in claim 2, wherein
the discharge control means displays on a display means the information of the reception of the refreshing discharge requirement signal from the battery control unit upon receiving the signal.

4. A motorized vehicle power system as claimed in claim 3, wherein
the discharge control means operates to execute refreshing discharge by the discharging means when a refreshing switch is turned on within a specified time and thereafter execute charging and operates to execute charging when said refreshing switch is not turned on while the information of the reception of the refreshing discharge requirement signal from the battery control unit is displayed on the display means.

5. A motorized vehicle power system as claimed in claim 3, wherein the battery control unit decides that the refreshing discharge is necessary when the refreshing discharge is not executed down to the completion of refreshing after the display of the necessity of the preceding refreshing discharge.

6. A motorized vehicle power system as claimed in claim 2, wherein the discharge control means operates to start the refreshing discharge by the discharging means and display the refreshing as being in operation on the display means upon receiving the refreshing discharge requirement signal and operates to stop the refreshing discharge and execute charging when a refresh cancel switch is turned on.

7. A motorized vehicle power system as claimed in claim 1, wherein the battery control unit decides whether or not the refreshing discharge is necessary on the basis of at least any one of the number of times of charging, the number of times of discharging or the number of cycles of charging and discharging, counted from the initial or preceding refreshing discharge.

8. A motorized vehicle power system as claimed in claim 1, wherein the battery control unit decides that the refreshing discharge is necessary when a difference larger than a specified quantity exists between a battery effective capacity perceived by said battery control unit and a discharge capacity below a specified setting voltage.

9. A motorized vehicle power system as claimed in claim 1, wherein the battery control unit adjusts the number of times of charging on the basis of either a battery temperature at the time of starting charging or a battery temperature at the time of ending charging and determines that a refreshing discharge is necessary when the adjusted number of times of charging becomes equal to or greater than a predetermined value.

10. A motorized vehicle power system as claimed in claim 9, wherein the battery control unit increases the adjustment as the battery temperature becomes higher.

11. A motorized vehicle power system as claimed in claim 10, wherein the battery control unit counts the number of times of charging by a specified quantity when discharging is executed after the end of the charging.

12. A motorized vehicle power system as claimed in claim 1, wherein a removable battery casing is adapted to be mounted on the associated vehicle and the removable battery casing has the battery control unit built-in as a unit with it.

13. A motorized vehicle power system as claimed in claim 1, wherein the rechargeable battery, the battery control unit and the charging unit are mounted on the associated vehicle.

14. A motorized vehicle power system as claimed in claim 13, wherein a removable battery casing is adapted to be mounted on the associated vehicle and the removable battery casing has the battery control unit built-in as a unit with it.

15. A motorized vehicle and power system comprised of a vehicle frame a rechargeable battery carried by said vehicle frame, a battery control unit for executing control of battery conditions carried by said vehicle frame and including means for detecting a remaining capacity of said rechargeable battery and a charging unit for charging rechargeable battery, said charging unit being provided with a discharging means for executing a refreshing discharge of said rechargeable battery and a discharge control means for controlling said refreshing discharge executed by said charging device on the basis of a refreshing discharge requirement signal sent from said battery control unit.

16. A motorized vehicle and power system as set forth in claim 15 wherein a removable battery casing is adapted to be mounted on the vehicle and the removable battery casing has the battery control unit built-in as a unit with it.

17. A motorized vehicle and power system as set forth in claim 16 wherein the charging unit is carried by the vehicle frame.

* * * * *